Dec. 2, 1941.   V. ASARO   2,264,607
SPRING CUSHION STRUCTURE
Filed March 13, 1939   3 Sheets-Sheet 1
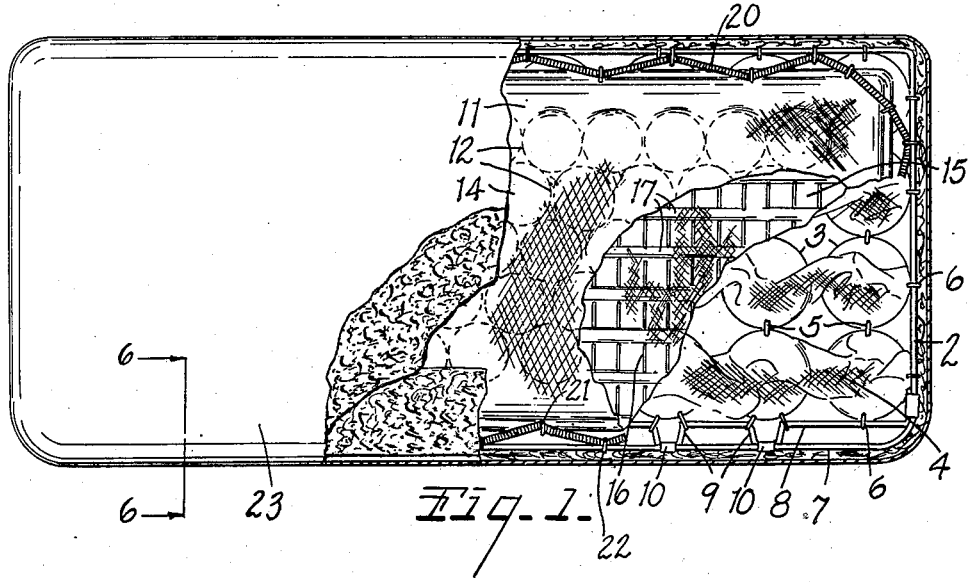
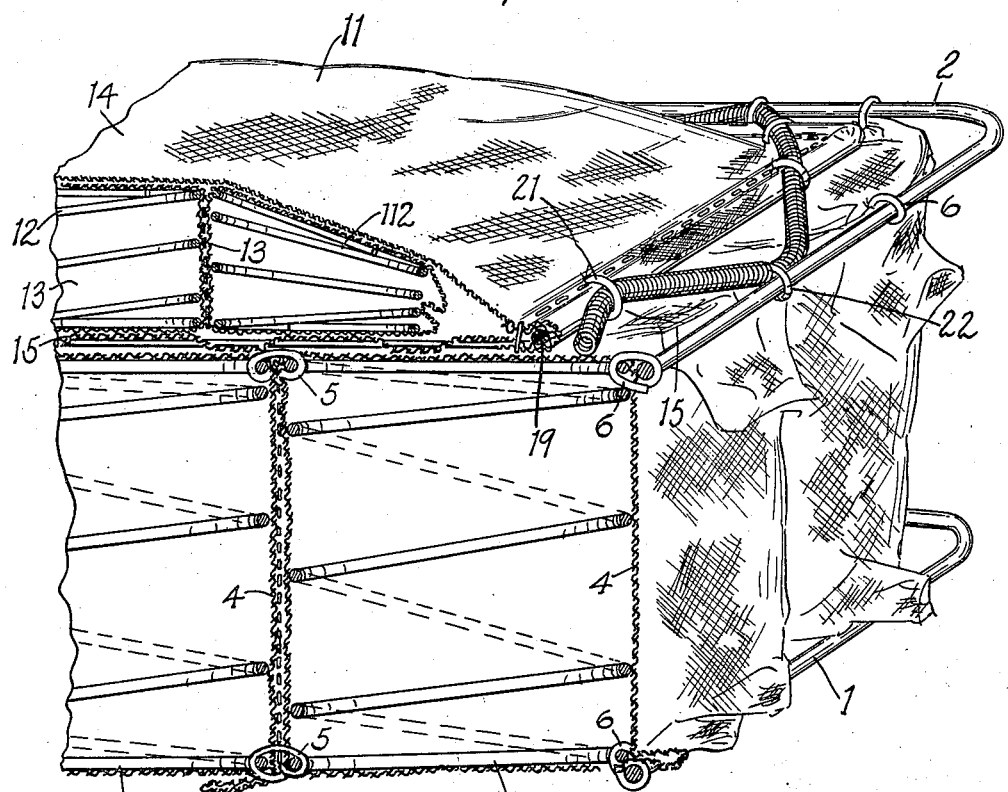
INVENTOR.
Vito Asaro
BY Earl T. Chappell
ATTORNEYS Dec. 2, 1941.  V. ASARO  2,264,607
SPRING CUSHION STRUCTURE
Filed March 13, 1939   3 Sheets-Sheet 2
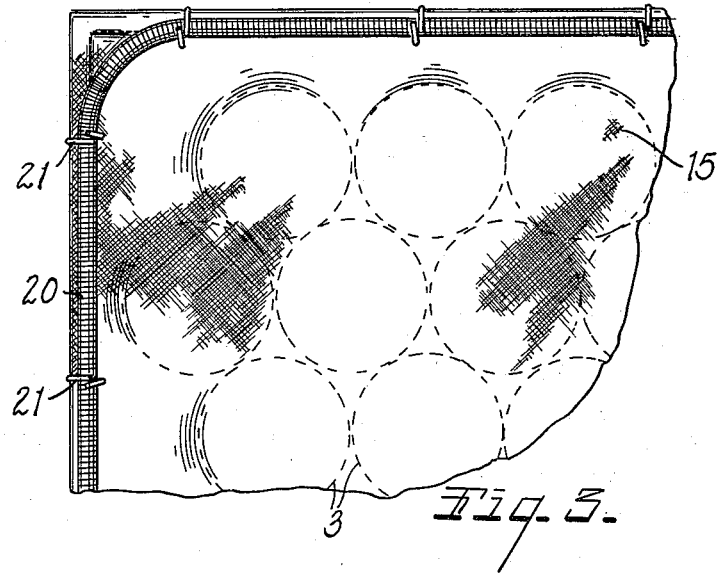
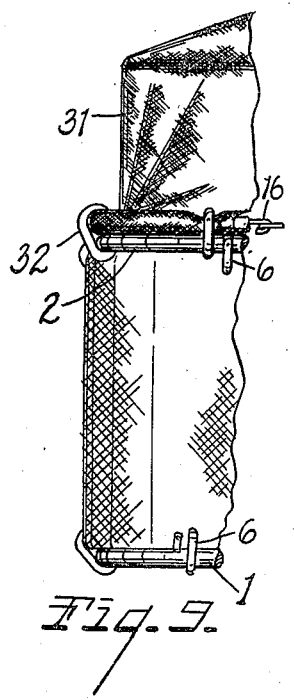
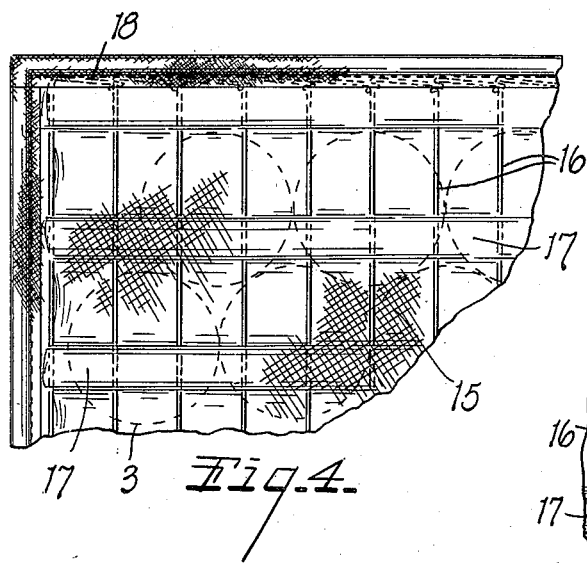
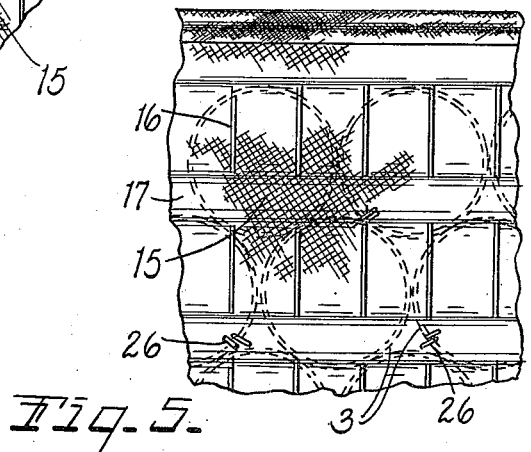
INVENTOR.
Vito Asaro
BY Earl T. Chappell
ATTORNEYS Dec. 2, 1941.  V. ASARO  2,264,607
SPRING CUSHION STRUCTURE
Filed March 13, 1939   3 Sheets-Sheet 3
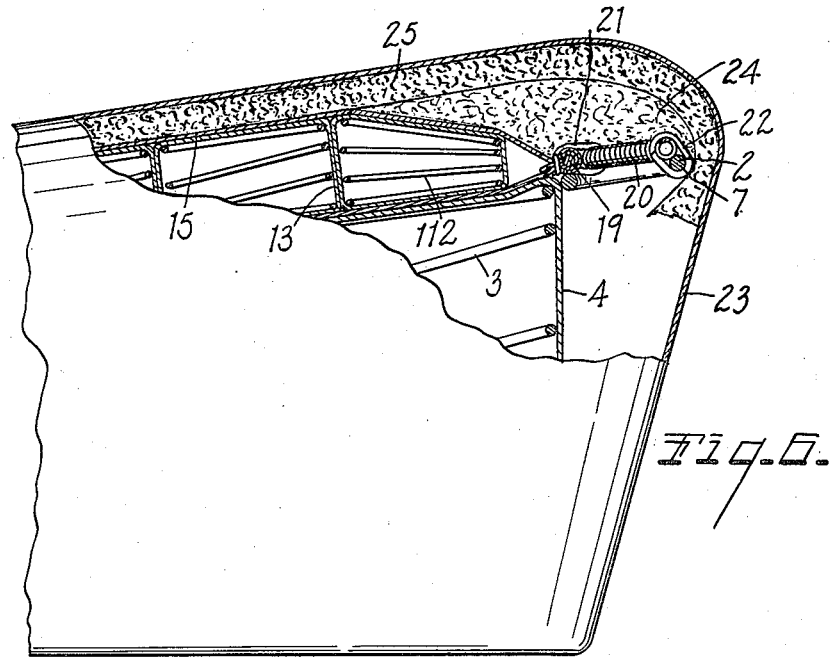
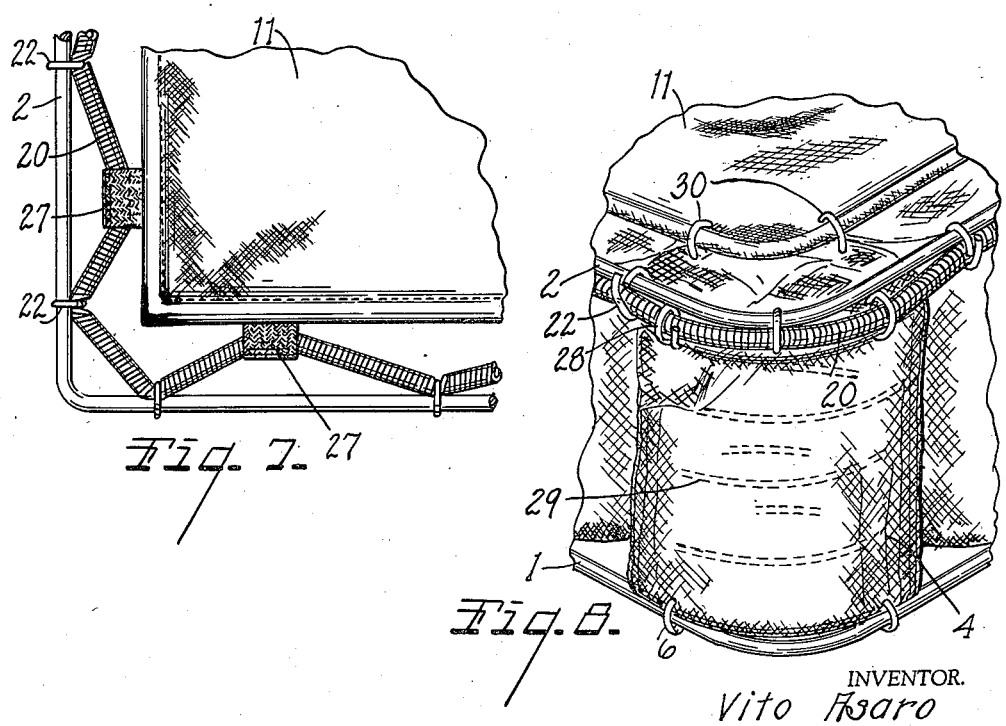
INVENTOR.
Vito Asaro
BY Earl & Chappell
ATTORNEYS Patented Dec. 2, 1941

2,264,607

UNITED STATES PATENT OFFICE 2,264,607

SPRING CUSHION STRUCTURE

Vito Asaro, Detroit, Mich., assignor to Leonard A. Young, Detroit, Mich.

Application March 13, 1939, Serial No. 261,611

23 Claims. (Cl. 155—179)

This invention relates to improvements in spring cushion structures.

The main objects of this invention are:

First to provide a spring cushion structure which is well adapted for use in automobile cushion springs and, while presenting a flexible yielding surface or support, maintains a smooth upholstered surface for a long period of use.

Second, to provide a structure of this character in which the upholstery covering may be of a smooth type as distinguished from the tufted or pleated type, and is supported without wrinkling even after a long period of use.

Third, to provide a cushion structure which, while presenting a soft yielding surface, does not have objectionable lateral or shimmying movement in use.

Fourth, to provide a spring cushion structure which is effective as a shock absorber or in minimizing the transmission of road shocks through the cushion.

Fifth, to provide a cushion structure which is economical in its parts and in which the parts may be readily assembled in a completed cushion.

Objects pertaining to details and economies of my invention will definitely appear from the description to follow. The invention is defined in the claims.

A structure which embodies the features of my invention is clearly illustrated in the accompanying drawings, in which:

Fig. 1 is a fragmentary top plan view of a structure embodying the features of my invention, parts being broken away to show the relation of certain of the superimposed parts constituting the structure.

Fig. 2 is an enlarged perspective view in vertical section.

Fig. 3 is a fragmentary top plan view of the spring upholstery pad unit as prepared for application to a spring cushion structure or base unit.

Fig. 4 is an inverted plan view of the structure shown in Fig. 3.

Fig. 5 is a fragmentary inverted plan view showing certain of the springs of the upholstery pad unit attached to the supporting mat constituting the bottom casing.

Fig. 6 is a fragmentary end elevation partially in vertical section on a line corresponding to line 6—6 of Fig. 1.

Fig. 7 is a slightly modified form or embodiment in the matter of connecting my upholstery pad unit to the border member.

Fig. 8 is a fragmentary perspective view of another modification or embodiment of my invention.

Fig. 9 is a fragmentary side elevation showing still another embodiment of my invention.

In the accompanying drawings I have illustrated certain embodiments of my invention as in spring cushion structures of the automobile seat type. It should be borne in mind, however, that my improvements are desirable for use in furniture and other upholstery, particularly where it is desired to provide a relatively soft or yielding surface and at the same time provide a structure in which the upholstery covering is effectively maintained in position, even though continuous over the entire cushion structure and without tufting, pleats or flutings.

For convenience in description I refer to the main spring or bottom unit as the base unit and I provide a superimposed spring unit which I designate as an upholstery pad unit, inasmuch as it is designed to supplant a substantial amount of fibrous padding that is commonly employed in spring cushion structures and performs other functions in securing the desired resilient support for the upholstery covering.

In the embodiment of my invention illustrated in the accompanying drawing the base or bottom unit comprises bottom border member 1 and top border member 2. The top border member is carried by the body springs 3 which are housed or encased in pockets 4, the pockets being of the series type and arranged in parallel rows. The springs of adjacent rows are secured together at top and bottom by clips 5 and to the border frame by the clips 6. In the structure illustrated the front piece 7 of the border member is arranged in what is commonly designated as outwardly offset relation. A cross member 8 is provided to which the front border springs are secured by clips 6. This member 8 is provided with an offset 9 secured to the front piece 7 of the top border member by the clips 10.

It will be noted that the springs in this preferred embodiment are of the cylindrically coiled type, that is, the coils are of uniform diameter from top to bottom.

In practice the bottom border member is secured to a suitable base frame to which the upholstery cover may be attached. I have not illustrated such base frame or the details of securing the upholstery cover thereto as this forms no part of my invention.

My upholstery pad unit is designated generally by the numeral 11. It comprises a plurality of springs 12 of the cylindrically coiled type arranged in pockets 13, the pocketed springs of adjacent rows being preferably arranged in nested relation as shown in the drawings. These springs are of substantially lighter gauge stock than those of the main or body springs; they are also of smaller diameter and of substantially less height, one of the objects being to provide an upholstery pad unit which is relatively soft and yielding as compared to the springs of the base unit.

The rows of springs 12 are arranged in a casing consisting of a top 14 and a bottom 15, these being formed of fabric and the bottom being provided with a plurality of strands 16 of resilient wire arranged in such spaced relation as to provide an effective supporting mat between the springs of the base unit and the upholstery mat and to effectively support the springs of the upholstery mat for independent collapsing movement; that is, the springs of the upholstery mat are not connected to each other except through the pocket and the side supporting relation in which they are arranged in the assembly.

The wire strands 16 are preferably woven or rove through the fabric of the casing bottom which has pleat-like portions 17 through which the wires or strands are inserted, thereby attaching them to the fabric and also holding the wires in their spaced relation. In the embodiment illustrated the ends of the strands are connected at 18, see Fig. 4. These top and bottom casing members are brought together at their edges and seamed around a reinforcing bead 19, preferably a flexible cord.

The upholstery unit is arranged upon the base unit and its edges are connected to the top border frame. This connection preferably consists of a continuous helical spring connector 20 which is connected to the border of the upholstery pad unit at intervals by means of the clips 21. It will be noted that in assembled relation the edge or bead of the upholstery pad is in substantially the plane of the top border frame and in spaced relation thereto.

To yieldably or floatingly secure the pad in position the reaches of the connector 20 between the clips 21 are extended and connected by clips 22 to the top border frame, this in effect providing a plurality of resilient or spring connections for the upholstery pad to the top border member of the base unit. It will be observed that when thus connected the upper coils of the border springs designated by the numeral 112 are supported in outwardly inclined or canted relation. This in effect provides an upholstery pad unit having beveled or outwardly inclined edges.

In applying the upholstery covering 23 I arrange a roll of fibrous padding material 24 around the border of the spring upholstery pad 11 and in overlapping relation to the outwardly canted springs or the outwardly beveled edges of the upholstery pad unit as shown in Fig. 6. I then arrange a relatively thin layer or pad of fibrous padding material 25 over the pad 11 and over the filler 24, and then apply the upholstery covering 23 which is attached by any suitable means, a supporting base such as shown in the Clark Patent No. 2,077,459, issued April 20, 1937, being a desirable supporting and upholstery attaching structure to use in this connection.

With this arrangement of parts the upholstery covering is effectively supported throughout and it is found that it remains smooth and unwrinkled even after long and severe usage. A cushion embodying these features presents a soft and agreeable feel or yielding quality and at the same time does not have objectionable lateral or shimmying movement. The springs of the upholstery pad unit, as stated, are not attached to each other in any manner to affect their vertical yielding or compression but they may be attached as indicated at 26 to the strands of the supporting mat. This prevents their shifting about on the mat or within the casing.

Structures embodying my invention are effective as shock absorbers, that is, they minimize the transmission of road shocks or shocks delivered by the chassis of the motor vehicle to the occupant of the seat.

The upholstery pad also serves as a shock absorber protecting the spring unit below, and, it is found, greatly prolongs the life thereof. These various points have been demonstrated by road tests and also in laboratory tests with apparatus especially designed for the purpose.

In the modification shown in Fig. 7 the connector 20 is connected to the upholstery pad unit 11 by means of tapes 27 instead of by means of the clips 21.

In the embodiment shown in Fig. 8 the resilient connector 20 is connected by clips 28 to the top coils of the border springs 29 of the base member and the edge or bead of the pad unit is connected by the clips 30 to the top coils, thus providing a resilient connection for the upholstery pad unit to the border frame member 2.

In the embodiment shown in Fig. 9 the upholstery pad unit 31 is of substantially the dimensions of the top border frame 2 and is connected directly thereto by means of the clips 32. The casing in this embodiment includes the reinforced bottom or resilient mat structure.

I have not illustrated other embodiments or adaptations of my invention as it is believed that these disclosures will enable those skilled in the art to embody or adapt my invention as may be desired.

Having thus described my invention what I claim as new and desire to secure by Letters Patent is:

1. In a spring structure, the combination of a base unit comprising top and bottom border frames and a plurality of rows of pocketed body springs, the top and bottom coils of the border body springs being secured to the top and bottom border frames, the top and bottom end coils of the springs of adjacent rows being secured together, an upholstery pad unit comprising a plurality of rows of pocketd springs arranged with the springs of adjacent rows in nested relation, the springs of said pad unit being of substantially smaller diameter and length and of substantially lighter gauge stock than the springs of the base unit, a casing for said pad unit springs comprising top and bottom walls of fabric, the bottom wall having a plurality of parallel strands of resilient wire rove therethrough, the spacing of the strands being such that the reinforced bottom wall constitutes a flexible supporting mat for the springs of the pad unit supported upon the springs of the base unit, the springs of the pad unit being free for substantially independent compressing movement, the outer springs of the pad unit being substantially spaced from the edges of the walls of the casing which are brought together and provided with a border reinforcing bead which lies within the top border frame in spaced relation thereto and in substantially the plane thereof, and a resilient connection for the edges of said casing to said top border frame.

2. In a spring structure, the combination with a base spring unit provided with a top border frame, an upholstery pad unit comprising a plurality of rows of pocketed springs, the springs of said pad unit being of substantially smaller diameter and length and of substantially lighter gauge stock than the springs of the base unit, a casing for said pad unit springs comprising top and bottom walls of fabric, the bottom wall having a plurality of parallel strands of resilient wire rove therethrough, the spacing of the strands being such that the reinforced bottom wall constitutes a flexible supporting mat for the springs of the pad unit supported upon the springs of the base unit, the springs of the pad unit being free for substantially independent compressing movement, the outer springs of the pad unit being substantially spaced from the edges of the walls of the casing which are brought together and provided with a border reinforcing bead which lies within the top border frame in spaced relation thereto and in substantially the plane thereof, and a resilient connection for the edges of said casing to said top border frame.

3. In a spring structure, the combination of a base spring unit provided with a top border frame, an upholstery pad unit comprising a plurality of rows of pocketed springs, the springs of said pad unit being of substantially smaller diameter and length and of substantially lighter gauge stock than the springs of the base unit, a casing for said pad unit springs comprising top and bottom walls of fabric, the bottom wall having a plurality of parallel strands of resilient wire rove therethrough, the spacing of the strands being such that the reinforced bottom wall constitutes a flexible supporting mat for the springs of the pad unit supported upon the springs of the base unit, the springs of the pad unit being free for substantially independent compressing movement, the outer springs of the pad unit being substantially spaced from the edges of the walls of the casing which are brought together and provided with a border reinforcing bead which lies within the top border frame in spaced relation thereto and in substantially the plane thereof, and a continuous helical spring connector alternately connected to the top border frame and to the edges of said pad unit casing under tension whereby the outer springs of the said pad unit are normally held with their upper coils in canted relation providing an outwardly inclined border portion for the pad unit, the pad unit being supported by said helical connector in yielding floating relation upon said base unit.

4. In a spring structure, the combination of a base unit comprising top and bottom border frames and a plurality of rows of pocketed body springs, the top and bottom coils of the border body springs being secured to the top and bottom border frames, the top and bottom end coils of the springs of adjacent rows being secured together, an upholstery pad unit comprising a plurality of rows of pocketed springs, the springs of said pad unit being of substantially smaller diameter and length and of substantially lighter gauge stock than the springs of the base unit, a casing for said pad unit springs comprising flexible top and bottom walls, the bottom wall having a plurality of parallel strands of resilient wire secured thereto, the spacing of the strands being such that the reinforced bottom wall constitutes a flexible supporting mat for the springs of the pad unit supported upon the springs of the base unit, the springs of the pad unit being free for substantially independent compressing movement, and a resilient connection for the edges of said casing to said top border frame.

5. In a spring structure, the combination of a base spring unit provided with a top border member, an upholstery pad unit comprising a plurality of rows of pocketed springs, the springs of said pad unit being of substantially smaller diameter and length and of substantially lighter gauge stock than the springs of the base unit, a casing for said pad unit springs comprising flexible top and bottom walls, the bottom wall having a plurality of parallel strands of resilient wire secured thereto, the spacing of the strands being such that the reinforced bottom wall constitutes a flexible supporting mat for the springs of the pad unit supported upon the springs of the base unit, the springs of the pad unit being free for substantially independent compressing movement, and a resilient connection between the edges of said casing and said top border frame.

6. In a spring structure, the combination of a base spring unit provided with a top border member, an upholstery pad unit comprising a plurality of rows of pocketed springs, the springs of said pad unit being of substantially smaller diameter and length and of substantially lighter gauge stock than the springs of the base unit, a casing for said pad unit springs comprising flexible top and bottom walls, the bottom wall having a plurality of parallel strands of resilient wire secured thereto, the spacing of the strands being such that the reinforced bottom wall constitutes a flexible supporting mat for the springs of the pad unit supported upon the springs of the base unit, the springs of the pad unit being free for substantially independent compressing movement and a continuous helical spring connector alternately connected to the top border frame and to the edges of said pad unit casing under tension whereby the pad unit is supported by said helical connector in yielding floating relation upon said base unit.

7. In a spring structure, the combination of a base spring unit provided with a top border member, an upholstery pad unit comprising a plurality of springs supported to permit independent compressing movement, the springs of the pad unit being of substantially less strength than the springs of the base unit, a casing for said pad unit springs comprising top and bottom walls brought together at their edges and provided with a reinforcing bead, the bottom wall of the casing constituting a resilient supporting mat for the springs of the pad unit upon the springs of the base unit, and a continuous helical spring connector alternately connected to the top border member and to the reinforced edges of said pad unit casing under tension whereby the outer springs of said pad unit are normally held with their upper coils in outwardly canted relation and coacting with the casing to provide an outwardly inclined border portion for the pad unit.

8. In a spring structure, the combination of a base spring unit provided with a top border member, an upholstery pad unit comprising a plurality of springs supported to permit independent compressing movement, the springs of the pad unit being of substantially less strength than the springs of the base unit, a casing for said pad unit springs comprising top and bottom walls secured together at their edges, the bottom wall of the casing constituting a resilient supporting mat for the springs of the pad unit upon the springs of the bottom unit and a resilient connection between said casing and said top border member, an upholstery cover, relatively thin padding of fibrous material arranged between said cover and said pad unit, and a border filler of fibrous material arranged between said padding and the outwardly inclined border portion of said pad unit.

9. In a spring cushion structure, the combination of a base unit comprising bottom springs and a top border frame carried thereby, an upholstery spring pad unit comprising a plurality of springs, the springs of the pad unit being of substantially less strength than the springs of the base unit, the springs of said pad unit being supported for substantially independent compressing movement, a resilient supporting mat disposed between said units to support the springs of the pad unit upon the springs of the base unit, resilient connections between the edges of said pad unit and said top border frame whereby the pad unit is yieldingly supported upon the base unit with the edges of the pad unit in substantially spaced relation to the top border frame and in approximately the plane thereof, the upper coils of the border springs of the pad unit being normally held in outwardly canted relation, an upholstery cover provided with a relatively thin layer of fibrous padding over said pad unit, and a border padding of fibrous material arranged around the edges of the pad unit and overlapping the outwardly canted springs of said pad unit.

10. In a spring cushion structure, the combination of a base unit comprising bottom springs and a top border frame carried thereby, an upholstery spring pad unit comprising a plurality of springs, the springs of the pad unit being of substantially less strength than the springs of the base unit, the springs of said pad unit being supported for substantially independent compressing movement, a resilient supporting mat disposed between said units to support the springs of the pad unit upon the springs of the base unit, resilient connections between the edges of said pad unit and said top border frame, an upholstery cover provided with a relatively thin layer of fibrous padding over said pad unit, and a border padding of fibrous material arranged around the edges of the pad unit.

11. In a spring structure, the combination of a base unit comprising bottom springs and a top border frame carried thereby, an upholstery spring pad unit comprising a plurality of springs, the springs of the pad unit being of substantially less strength than the springs of the base unit, the springs of the pad unit being supported for substantially independent compressing movement, a resilient supporting mat disposed between said units and comprising a fabric having a plurality of parallel resilient wire strands secured together and spaced to support the springs of the pad unit upon the springs of the base unit, and means yieldingly connecting said pad unit to said border frame with its edges in substantially spaced relation to the border frame.

12. In a spring structure, the combination of a base unit comprising bottom springs and a top border frame carried thereby, an upholstery spring pad unit comprising a plurality of springs, the springs of the pad unit being of substantially less strength than the springs of the base unit, the springs of said pad unit being supported for substantially independent compressing movement, a resilient supporting mat disposed between said units to support the springs of the pad unit upon the springs of the base unit, and resilient connections between the edges of the pad unit and the top border frame.

13. In a spring structure, the combination of a base unit comprising bottom springs and a top border frame carried thereby, an upholstery spring pad unit comprising springs of substantially less strength than the springs of the base unit, the springs of said pad unit being supported for substantially independent compressing movement, a resilient supporting mat disposed between said units, resilient connections between said pad unit and said top border frame whereby the pad unit is yieldingly supported upon the base unit with the edges of the pad unit in substantially spaced relation to the top border frame and in approximately the plane thereof, the upper coils of the border springs of the pad unit being normally held in outwardly canted relation providing an outwardly inclined edge portion for said pad unit, an upholstery cover provided with a relatively thin layer of padding over said pad unit, and a border padding of fibrous material arranged around the edges of the cushion and overlapping the outwardly canted springs of said pad unit.

14. In a spring structure, the combination of a base unit comprising bottom springs and a top border frame carried thereby, an upholstery spring pad unit comprising a plurality of springs supported and associated with one another for substantially independent compressing movement, and a wire reinforced supporting mat connected to said pad springs and disposed between said units, connections between said pad unit and said top border frame holding the same in operative relation with the border springs of the pad unit in canted condition, an upholstery cover provided with a relatively thin layer of padding over said pad unit, and a border pad of fibrous material arranged around the edges of the base unit and overlapping the canted edges of said pad unit.

15. In a spring structure, the combination of a base unit comprising bottom springs and a top border frame carried thereby, an upholstery spring pad unit comprising springs of substantially less strength than the springs of the base unit, the springs of said pad unit being supported for substantially independent compressing movement, a resilient supporting mat disposed between said units and comprising a fabric having a plurality of parallel resilient wire strands secured together and spaced to support the springs of the pad unit upon the springs of the base unit, resilient connections between the edges of said pad unit and said top border frame, an upholstery cover provided with a relatively thin layer of padding over said pad unit, and a border padding of fibrous material arranged around the edges of the cushion and overlapping the edges of said pad unit.

16. In a spring structure, the combination of a base unit comprising bottom springs and a top border frame carried thereby, an upholstery spring pad unit comprising springs of substantially less strength than the springs of the base unit, the springs of said pad unit being supported for substantially independent compressing movement, a resilient supporting mat disposed between said units, resilient connections between said pad unit and said top border frame whereby the pad unit is yieldingly supported upon the base unit with the edges of the pad unit in substantially spaced relation to the top border frame and in approximately the plane thereof, the upper coils of the border springs of the pad unit being normally held in outwardly canted relation providing an outwardly inclined edge portion for said pad unit.

17. In a spring structure, the combination of a base unit comprising bottom springs and a top border frame carried thereby, an upholstery spring pad unit comprising springs of substantially less strength than the springs of the base unit, the springs of said pad unit being supported for substantially independent compressing movement, a resilient supporting mat disposed between said units, and resilient connections between the edges of said pad unit and said top border frame.

18. In a spring structure, the combination of a base unit comprising bottom springs and a top border frame carried thereby, an upholstery spring pad unit comprising springs of substantially less strength than the springs of the base unit, the springs of said pad unit being supported for substantially independent compressing movement, a resilient supporting mat disposed between said units and comprising a fabric having a plurality of parallel resilient wire strands secured together and spaced to support the springs of the pad unit upon the springs of the base unit, and resilient connections between the edges of said pad unit and said top border frame.

19. A spring structure comprising a plurality of springs associated for independent collapsing movement, a casing comprising top and bottom walls secured at their edges, the bottom wall being provided with reinforcing strands of resilient wire coacting therewith to provide a resilient supporting mat for the springs, and means for resiliently securing the edges of the casing to a supporting structure comprising a continuous helical coiled spring member connected to the edges of the casing at spaced points whereby the reaches between said points of connection may be secured to a surrounding support member.

20. A pad adapted to be superimposed upon a spring cushion structure having a top border frame, comprising a plurality of rows of helically coiled pocketed springs arranged with the springs of adjacent rows in nested relation but free for substantial independent movement, a casing enclosing said springs comprising top and bottom walls of fabric brought together at their edges and provided with a reinforcing bead, the bottom wall having a plurality of parallel strands of resilient wire rove therethrough, the spacing of the strands being such that the reinforced bottom wall constitutes a flexible resilient supporting mat for the pad springs when the pad is superimposed upon a spring structure, and a continuous helical spring connector connected to the reinforced edges of said casing at spaced points and adapted for connection between said points to the top border frame of a spring structure on which the pad is superimposed whereby the outer springs of the pad assembly are normally held with their upper coils in outwardly canted relation and coact with the casing to provide an outwardly inclined border portion for the encased springs.

21. In a spring structure, the combination of a spring cushion unit having body springs and a top border frame, a pad superimposed upon said spring cushion unit, comprising a plurality of rows of helically coiled pocketed springs arranged with the springs of adjacent rows in nested relation but free for substantial independent movement, and a casing enclosing said pad springs comprising top and bottom walls of fabric brought together at their edges, the bottom wall having a plurality of parallel strands of resilient wire rove therethrough, the spacing of the strands being such that the reinforced bottom wall constitutes a flexible resilient supporting mat for the pad springs on the body springs, and a resilient connector means connected to the edges of said casing and to the top border frame of the spring cushion unit on which the pad is superimposed.

22. A pad adapted to be superimposed upon a spring cushion structure having a top border frame, comprising a plurality of rows of helically coiled pocketed springs arranged with the springs of adjacent rows in nested relation but free for substantial independent movement, a casing enclosing said springs comprising top and bottom walls of fabric, the bottom wall having a plurality of parallel strands of resilient wire rove therethrough, the spacing of the strands being such that the reinforced bottom wall constitutes a flexible resilient supporting mat for the pad springs when the pad is superimposed upon a spring structure, and a continuous helical connector means connected to the edges of said casing at spaced points and adapted for connection between said points to the top border frame of a spring structure on which the pad is superimposed.

23. In a spring structure, the combination of a spring cushion unit having body springs and a top border frame, a pad superimposed upon said spring cushion unit, comprising a plurality of springs associated for independent collapsing movement, and a casing enclosing said springs comprising top and bottom walls secured at their edges, the bottom wall being provided with reinforcing strands of resilient wire coacting therewith to provide a resilient supporting mat for the springs of the pad on the springs of said spring cushion unit, and means resiliently securing the pad casing to the top border frame of the spring cushion unit.

VITO ASARO.